United States Patent Office

3,074,984

Patented Jan. 22, 1963

3,074,984

PROCESS FOR PREPARING CYCLOPROPANE DERIVATIVES

Howard Ensign Simmons, Jr., Wilmington, Del., assignor to E. I. du Pont de Nemours and Company, Wilmington, Del., a corporation of Delaware No Drawing. Filed Jan. 8, 1959, Ser. No. 785,572
15 Claims. (Cl. 260—414)

This invention relates to a new process for preparing cyclic organic compounds. In particular, it refers to a process for preparing cyclopropane and compounds which contain cyclopropyl groups.

Compounds which contain a cyclopropyl group are useful in many fields. Cyclopropane, the simplest member of this group of compounds, is employed in medical practice as an anesthetic. Other compounds in which one or more cyclopropyl groups are present, are employed as components of insecticidal compositions, as additives in liquid fuels, as alkylating agents and as a source of polymeric compositions.

Compounds which contain the cyclopropyl group have been prepared by pyrolysis of pyrazolines, by reaction of 1,3-dihaloalkanes with divalent metals and by reaction of selected alkyl monohalides, for example, neopentyl chloride, with alkali metals. Cyclopropanes have also been obtained by reaction of an olefin with diazomethane or with a trihalomethane in the presence of an alkali metal alkoxide. These methods of preparation frequently give poor yields of the cyclopropanes and lead to complex mixtures of products from which the cyclopropyl compound is difficult to isolate. The known methods are not suitable for the preparation of pure forms of optical isomers or stereoisomers of compounds having a cyclopropyl group.

In accordance with the present invention cyclopropanes, that is, compounds which contain cyclopropyl groups, are obtained by reacting, in a solvent for components (1) and (2), (1) a preformed ethylenically unsaturated compound, (2) a polyhalogenated organic compound having two halogens on the terminal carbon, one halogen being iodine and the other being of atomic number 17–53, inclusive, and (3) a metal composition comprising zinc and copper. Each of these components is discussed more fully in the paragraphs which follow.

Ethylenically unsaturated compounds which are employed in the process have at least one carbon-to-carbon double bond in which the two carbons joined by the double bond have up to four substituents. The substituents are aliphatic, cycloaliphatic or carbocyclic aromatic groups which are singly bonded through carbon to the doubly bonded carbons with at most one of the substituents being bonded through oxygen to said doubly bonded carbons. At most one of the doubly bonded carbons may bear aromatic groups. The unsaturated compounds are present initially in the process are not formed in situ.

The ethylenically unsaturated compounds which are employed in the process are represented by the formula

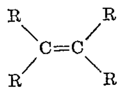

in which each R represents hydrogen or an aliphatic, cycloaliphatic or carbocyclic aromatic group which is singly bonded to the ethylenic carbons through carbon or at most one oxygen and in which the aromatic groups, if more than one is present, are bonded to one and the same carbon atom. The R groups may be joined to form an aliphatic ring of which the doubly bonded carbons can be a part. The R groups may be alike or different. The ethylenically unsaturated compounds can have more than one carbon-to-carbon double bond.

The operable ethylenically unsaturated compounds may be regarded as ethylene and substituted ethylenes which have up to four substituents on the doubly bonded carbons. Examples of these substituents, referred to as R in the above formula, are methyl, butyl, cyclohexyl, p-isopropylphenyl, naphthyl, propyloxy, acetyloxy, ethoxycarbonylmethyl, methoxyethoxy, 3-chloropropyl, 4-fluorocyclohexyl and the like.

The ethylenically unsaturated compounds, as defined, are broadly operable in the process although yields of cyclopropyl derivatives which are obtained will be dependent to some extent on the chemical characteristics of the unsaturated compounds. Thus, reduced yields of cyclopropyl derivatives are obtained from ethylenically unsaturated compounds which contain Zerewitinoff active hydrogen, that is, hydrogen which reacts with a Grignard reagent, and from unsaturated compounds which readily form homopolymers. Certain groups of unsaturated compounds are, therefore, preferred for use in the process of the invention. These preferred groups are described in the following paragraphs.

A group of unsaturated compounds which are preferred for use in the process are free of Zerewitinoff active hydrogen, that is, hydrogen which reacts with a Grignard reagent. The compounds are preferably neutral, that is, they do not form salts with acids or bases. They have at least one carbon-to-carbon double bond in which the two carbons joined by said double bond have up to four substituents in which no more than one of the substituents is bonded through oxygen to said doubly bonded carbons, any remaining substituents being singly bonded through carbon to the doubly bonded carbons, and at most one of the doubly bonded carbons bearing aromatic groups. The substituents on the doubly bonded carbons can be joined to form an aliphatic ring in which the doubly bonded carbons are part of the ring. The substituents can be hydrocarbon, halohydrocarbon, oxygen containing hydrocarbon and nitrogen containing hydrocarbon. Illustrative of such groupings are aliphatic, cycloaliphatic and aromatic hydrocarbyl, oxygen interrupted hydrocarbyl, hydrocarbyloxy, hydrocarbylcarbonyloxy, hydrocarbyloxycarbonyl, N,N-di(hydrocarbyl)-carbomoyl and the like. The total number of carbon atoms present in the ethylenically unsaturated reactant is not critical. However, for ease of handling, it is preferred that the compound contain at most forty carbon atoms.

Examples of classes of operable compounds are monoolefins (octene-3-dodecene-1), polyolefins (octa-2,6-diene), cycloalkenes (4-phenylcyclohexene, octahydronaphthalenes), unsaturated esters (vinyl oleate, methyl linoleate), unsaturated ethers (phenyl vinyl ether, allyl naphthyl ether), unsaturated acetals (dipropyl acetal of crotonaldehyde), and unsaturated amides (N,N-dimethyl oleamide).

These examples illustrate simple olefinic structures which are operable in the process. Compounds with larger and more complicated molecules, for example, compounds found in nature, whose structures include the above types of olefinic groupings, are operable in the process. These compounds are included in the scope of the invention.

The polyhalogenated organic compounds employed in the process have the general formula RCHXI, where R is hydrogen or an organic group free of Zerewitinoff active hydrogen, and X is a halogen of atomic number of 17–53, inclusive. The nature of the R group is not critical with respect to the number of carbon atoms in the group or the substituents on the group, provided, of course, as stated above that the substituents are free of Zerewitinoff active hydrogen. The ethylenically unsaturated compounds described in the earlier paragraphs can function as the iodine-containing component if the unsaturated compound has in its structure the group given above. In a preferred group of iodine-containing compounds R is hydrogen or an aliphatically saturated hydrocarbon group of up to 7 carbons and X is a halogen of atomic number of 17–53, inclusive, that is, X is chlorine, bromine or iodine. In an especially preferred group, the compounds have the structure $RCHI_2$, where R is hydrogen or an alkyl group of up to 7 carbons. Examples of operable iodine-containing compounds are methylene iodide, chloriodomethane, 1,1-diiodopropane, 1-chloro-1-iodohexane, 1-bromo-1-iodoheptane, 2-cyclohexyl-1,1-diiodoethane, 1,1-diiodooctane, 2-ethoxy-1,1-diiodoethane, 4-phenyl-1,1-diiodobutane, and the like.

The iodine-containing compound need not be prepared prior to addition to the reaction medium. The component can be prepared in situ by employing suitable precursors. For example, an alkylidene dichloride, such as methylene dichloride, can be employed with free iodine or with zinc iodide in the reaction medium to form the iodine-containing component. This optional manner of operating the process of the invention provides great versatility and permits the preparation of iodo compounds which may not be readily available.

Optionally, iodine can be employed as a catalyst in the reaction. The addition of iodine in minor quantities, while not critical or essential to the operability of the process, can and frequently does lead to higher yields of desired compounds in shorter periods of time.

The third essential component in the process of the invention is the zinc-copper composition which is prepared by methods similar to those described in the literature [Howard, J. Res. Nat. Bur. Standards 24, 677 (1940) and Buck et al., J. Inst. Petroleum 34, 339 (1948)]. Its preparation is illustrated in examples given in later paragraphs. This component in the reaction is generally decribed as a zinc-copper couple and is a sintered composition of zinc and copper. The zinc-copper couple can be used in various forms, for example, shavings, thin sheets, pellets or preferably finely divided powder. The latter form is preferred since it provides maximum exposure of metal surfaces in the reaction mixture. The couple will ordinarily contain from 1–20% copper, i.e., the ratio of zinc to copper is in the range of 99:1 to 80:20. Preferably the zinc-copper composition contains at least 5% copper.

The process is preferably conducted in a suitable reaction medium in which the ethylenically unsaturated compound and the iodine-containing compound are soluble. The solvents are generally liquids at the temperature of the reaction and they are preferably free of Zerewitinoff active hydrogen, that is, hydrogen which can react with a Grignard reagent. The presence of an active hydrogen requires extra quantities of the other components to effect formation of cyclopropyl derivatives.

The preferred solvents are neutral compounds, that is, neither acidic nor basic, and contain at least one oxygen which is singly bonded to each of two carbon atoms. Ethers and esters, that is, compounds with the structures ROR′ and RC(O)OR′, where R and R′ are hydrocarbon groups are especially suited as solvents. In the preferred group of solvents, R and R′ are saturated hydrocarbons, each of which has at most eight carbons and together have at most twelve carbons. Examples of operable solvents are dimethyl ether, diethyl ether, di-n-butyl ether, ethyl butyl ether, di-n-amyl ether, ethyl cyclohexyl ether, ethyl acetate, methyl propionate, octyl acetate, and octyl butyrate. R and R′ can be joined to form a cyclic group of which the ether oxygen is a member, for example, pentamethylene oxide, valerolactone.

The boiling point of the solvent is not critical and is not related to the operability of the process. Since boiling point is in inherent property of the solvent, it will be determined by the structure and composition of the solvent as defined above.

The preformed ethylenically unsaturated compound can serve as a solvent for the reaction particularly if the compound is a liquid at the reaction temperature and contains an oxygen atom singly bonded to two carbon atoms. Under such circumstances, the use of an additional solvent may not be necessary.

The relative quantities in which the reactants are used can vary over a wide range. The quantities will be determined by the number of carbon-to-carbon double bonds which are present in the olefin and on the reactivity of the double bonds. For each carbon-to-carbon double bond present in hte olefin, the molar ratio of the iodine-containing component to olefin will generally lie between about 0.3 and about 6.0; the preferred ratio lies between about 0.5 and 4.0. The molar ratio of the iodine-containing component to the metal component will lie between about 0.05 and 3.0; the preferred ratio lies between 0.5 and 2.0. The amount of iodine when used in the elemental form will generally lie between about 1% and 50% of the weight of the metal component; the preferred amount lies between about 20% and 35% of the weight of the metal component. The larger quantities of iodine are employed when it is used as a precursor in the formation of the iodine-containing component.

The quantity of solvent employed in the reaction is not critical. It is used in sufficient amount to permit satisfactory contact of the components of the reaction during the process. Preferably, the quantity of solvent employed is sufficient to provide a fluid mass which can be agitated.

The ratios of quantities of reactants discussed above have been found to give satisfactory yields of cyclopropanes in the process of the invention. However, ratios other than those described can be employed in the process to yield cyclopropanes. Th ratios described above are not to be construed as limiting in the operability of the process.

The reaction is conducted under substantially anhydrous conditions in a chamber which is preferably made of material that is not attacked by the components of the reaction, for example, glass, stainless steel, or platinum.

The pressure employed during the reaction is not critical and is generally a matter of convenience. When the components of the reaction are high boiling, the reaction can be conducted at atmospheric pressure in vessels with suitable provision to avoid access of moisture from the air. If the ethylenically unsaturated reactant is a gas or a low-boiling liquid, the reaction is preferably conducted in a closed pressure vessel under autogenous pressure. Autogenous pressure can also be employed if a low-boiling solvent is used and it is desired to operate at a temperature which is higher than the atmospheric boiling point of the solvent. Pressures up to 10,000 atmospheres or more can be employed in the reaction but little or no advantage is obtained by the use of excessively high pressures. Generally, pressures of up to 500 atmospheres are sufficient for operability.

The process can be operated over a broad range of temperatures. It can, and frequently is, operated at the boiling point of the solvent at atmospheric pressure. The temperature employed will be determined to some extent by the reactivity of the ethylenically unsaturated compound and can be as low as about −20° C. or as high as 300° C. or higher. Preferably the temperature of the reaction lies between about 25° and 200° C.

The time needed for completion of the reaction will depend to a considerable extent on the type of process employed, that is, whether continuous or batch, and on the other variables in the process. The time required for the reaction can be shortened by conducting the reaction under pressure or by employing a relatively high temperature. The time employed in a batch process can be as short as about 1 hour or less and as long as 200 hours or more. The preferred time, that is, the period that is usually sufficient to obtain good yields of product, lies between about 5 hours and about 75 hours. In a continuous flow process the time of reaction is short and unreacted components can be and usually are, recirculated to obtain maximum conversion.

Generally, the reaction vessel is flushed with an inert gas, for example, nitrogen to remove traces of moisture and it is then charged with the solvent, the zinc-copper couple and the iodine-containing component. Iodine crystals, as stated earlier, may be added, if desired, as a catalyst. The ethylenically unsaturated compound is then added, under pressure if necessary. The reaction is then conducted in accordance with well recognized methods of procedure at atmospheric or superatmospheric pressures, as desired.

An especially preferred manner of conducting the process of the invention consists in reacting the iodine component, for example, a 1,1-diiodoalkane, in a suitable solvent such as diethyl ether, with the zinc-copper couple in the presence of a catalytic quantity of iodine. The reaction mixture, after heating for several hours, is filtered to form a clear solution which is then added gradually to the ethylenically unsaturated compound. This method of operation is particularly suitable for obtaining good yields of cyclopropyl derivatives of ethylenic compounds which homopolymerize readily under more vigorous conditions of reaction. It is especially useful for preparing biologically active cyclopropanes from complex synthetic or naturally occurring olefinic compounds which readily isomerize or racemize when kept in contact for prolonged periods with a zinc halide.

The cyclopropanes are separated from the crude reaction mixtures by conventional and well recognized processes. Generally, for relatively high boiling cyclopropanes, water is added to the crude reaction mixture which is then extracted with a water-immiscible organic solvent, for example, ethyl ether, ethyl acetate, or the compound that is used as a solvent in the reaction. The water-immiscible layer is separated and washed with a dilute aqueous solution of an acid or a weak base, or an inorganic salt. It is preferably washed at least once with an aqueous sodium thiosulfate or sodium bisulfite solution during the purification process to remove free iodine if present. The organic water-immiscible layer is then dried with conventional drying agents, for example, anhydrous calcium sulfate or anhydrous magnesium sulfate. The organic layer can be distilled through an efficient fractionating column to isolate the desired cyclopropane.

The operation of the process of the invention is illustrated in the following examples. Two methods of preparing the zinc-copper couple are described in Examples A and B. The compositions prepared by either method are suitable for use in the process. Unless otherwise indicated, the couple prepared by the method of Example B below was used.

*Example A*

A mixture of 120 parts of 20-mesh zinc and 12 parts of precipitated copper powder was heated in a flask (capacity, 1000 parts of water) with vigorous agitation over a free flame until the color of the copper disappeared. The flask was then stoppered and allowed to cool. The powder was used without further processing.

*Example B*

A mixture of 240 parts of zinc dust (analytical reagent grade) and 30 parts of powdered cupric oxide (analytical reagent grade) was heated to 500° C. in an atmosphere of hydrogen for 4–5 hours. The gray solid, after cooling, was ground to a fine powder and stored in conventional glass bottles for later use. It contained about 90% zinc and about 10% copper.

*Example I*

A mixture of 50.0 parts of methylene iodide, 13.5 parts of zinc-copper couple (Example A) and 57 parts of anhydrous diethyl ether was placed in a 3-necked flask (capacity, 200 parts of water), equipped with a reflux condenser, magnetic stirrer, nitrogen inlet and dropping funnel. The mixture was stirred and warmed gently under nitrogen for 15 minutes. Cyclohexene (30.6 parts) was then added and the mixture was heated at reflux with agitation for 12 hours. The black, granular metal changed to a fine, gray powder. Water (100 parts) was added and the mixture was extracted with ether. The ether solution was washed with dilute bicarbonate solution and water. The solution was dried with anhydrous magnesium sulfate, filtered, and the ether then removed by evaporation. The liquid residue was distilled through an efficient fractionating column to yield 12.5 parts of bicyclo [4.1.0] heptane (norcarane), B.P. 115.5° C. (760 mm), $n_D^{27.5}$ 1.4538; yield, 69.5%.

*Analysis.*—Calc'd for $C_7H_{12}$: C, 87.42; H, 12.58. Found: C, 88.28; H, 12.81.

The infrared spectrum of the product was identical with the spectrum of an authentic example of norcarane.

*Example II*

A mixture of 24.6 parts of cyclohexene, 40.2 parts (0.15 mole) of methylene iodide, 12.3 parts of zinc-copper couple and 27 parts of tetrahydrofuran was stirred and heated to reflux for 24 hours. The mixture was cooled and diluted with about 30 parts of ether. There was then added about 25 parts of cold (0° C.) water and about 25 parts of aqueous 5% hydrochloric acid solution. The mixture was stirred thoroughly, filtered and the layer of organic liquid separated by conventional methods from the aqueous layer. The organic liquid was washed successively with water, saturated sodium thiosulfate solution and water. It was then dried over anhydrous magnesium sulfate and filtered. The filtrate was distilled in an efficient fractionating column to yield 2.83 parts of norcarane, B.P. 115–117° C.; yield 27%.

*Example III*

A mixture of 16.4 parts of cyclohexene, 26.8 parts of methylene iodide, 7.5 parts of zinc-copper couple and about 22.5 parts of ethyl acetate was agitated and warmed gently. The initial reaction was exothermic and continued for about 0.5 hour. After it subsided the mixture was stirred and heated to refluxing for 5 hours. The cooled mixture was filtered; the filtrate was washed successively with 5% hydrochloric acid, water, saturated sodium thiosulfate solution and water. It was then dried over anhydrous magnesium sulfate, filtered and distilled through an efficient fractionating column. There was obtained 0.77 part of norcarane, boiling at 114° C.; yield 8%.

*Example IV*

A mixture of 24.6 parts of cyclohexene, 26.3 parts of chloroiodomethane, 14.5 parts of zinc-copper couple and about 44.4 parts of tetrahydrofuran was stirred and heated under reflux for 70 hours. The mixture was cooled and diluted with about 35 parts of ethyl ether. There was then added dropwise and with stirring 50 parts of aqueous 5% hydrochloric acid solution. The mixture was filtered and the organic layer was washed successively with water, saturated sodium thiosulfate solution and again with water. It was dried over anhydrous magnesium sulfate, filtered and distilled through an efficient fractionating column to yield 1.11 parts of norcarane, B.P. 115–116° C.; yield, 8%.

*Example V*

A glass-lined reaction vessel (capacity, 200 parts of water), capable of withstanding pressure, was charged with 24.6 parts of cyclohexene, 54 parts of methylene iodide, 22 parts of zinc-copper couple and about 35 parts of ethyl ether. The vessel was sealed and heated at 100° C. for 45 hours under autogenous pressure. It was cooled, opened and 50 parts of aqueous 5% hydrochloric acid was added with stirring. After filtering the mixture, the organic layer was separated and treated as described in Example IV. There was obtained 5.53 parts of norcarane, boiling at 113–117° C.; $n_D^{25}$ 1.4543; yield, 29%.

*Example VI*

Using a procedure similar to that described in Example II, a mixture of 40.2 parts of methylene iodide, 24.6 parts of cyclohexene, 16.0 parts of zinc-copper couple, 5 parts of iodine and 70 parts of anhydrous ethyl ether was reacted for 48 hours. There was obtained 6.03 parts of norcarane, boiling at 115–118° C.; yield, 42%.

*Example VII*

A mixture of 50 parts of methylene iodide, 13.5 parts of zinc-copper couple, 150 parts of anhydrous diethyl ether and a small crystal of iodine was stirred under a nitrogen atmosphere at gentle reflux for 4 hours. The mixture was cooled to 20° C. and decanted through a fine-sintered glass funnel under slightly reduced pressure into a flask containing 15.3 parts of cyclohexene and 200 parts of diethyl ether. The resulting clear solution was stirred and heated at reflux for 18 hours. Zinc iodide precipitated from the reaction mixture during this period and was separated by filtration. The crude zinc iodide was shown by emission spectroscopy to contain approximately 50 p.p.m. of copper. The liquid filtrate was washed successively with dilute hydrochloric acid, dilute sodium bicarbonate solution and water and dried over anhydrous magnesium sulfate. The ether was removed by evaporation and the remaining liquid was distilled to give 2.1 parts of norcarane, B.P. 115–116° C.; $n_D^{25}$ 1.4542.

The process described in the preceding example is especially useful for preparing in good yields cyclopropyl derivatives of ethylenically unsaturated hydrocarbons which, under other conditions of reaction, yield principally homopolymers.

*Example VIII*

Using the procedure described in Example II, a mixture of 31.0 parts of cyclopentene, 80.4 parts of methylene iodide, 26.0 parts of zinc-copper couple, 5 parts of iodine and about 70 parts of anhydrous ethyl ether was stirred and heated at refluxing temperature for 72 hours. There was obtained from the reaction mixture 6.74 parts of bicyclo[3.1.0]hexane, B.P. 81–82° C.; $n_D^{25}$ 1.4373; yield, 27%.

*Analysis.*—Calc'd for $C_6H_{10}$: C, 87.73; H, 12.27. Found: C, 88.19; H, 12.27.

*Example IX*

A mixture of 20 parts of bicyclo[2.2.1]hept-2-ene (norbornylene), 25.4 parts of zinc-copper couple, 80.4 parts of methylene iodide, 5.0 parts of iodine and about 72 parts of anhydrous ethyl ether was heated at refluxing temperature with agitation for 48 hours. There was obtained from the reaction mixture 10.04 parts of tricyclo[3.2.1.0$^{2,4}$]octane, B.P. 136–137° C.; $n_D^{25}$ 1.4778.

*Analysis.*—Calc'd for $C_8H_{12}$: C, 88.82; H, 11.18. Found: C, 88.86; H, 11.12.

*Example X*

A mixture of 41.0 parts of bicyclo[2.2.1]hepta-2,5-diene (bicycloheptadiene), 25.4 parts of zinc-copper couple, 80.4 parts of methylene iodide, 5.0 parts of iodine and 72 parts of anhydrous ethyl ether was heated at reflux temperature with agitation for 48 hours. There was obtained from the reaction mixture 2.26 parts of tricyclo[3.2.1.0$^{2,4}$]oct-6-ene, B.P. 67–69° C. at 100 mm.; $n_D^{25}$ 1.4874.

*Analysis.*—Calc'd for $C_8H_{10}$: C, 90.50; H, 9.50. Found: C, 90.52; H, 9.43.

Examples I through X illustrate the application of the process to cycloaliphatic compounds which contain ethylenic linkages as part of the cyclic group. The examples also illustrate the variations in solvent, pressure, temperature, time, methylene halides and iodine catalyst which can be used in the process.

There can be prepared by the process as described above bicyclo[4.1.0]-2-ethylheptane from cyclohexene and 1,1-diiodopropane and tricyclo[5.4.0$^{1,7}$.0$^{5,7}$] undecane from 1,2,3,4,4a,5,6,1-octahydronaphthalene and methylene iodide. Other cycloaliphatic compounds which are operable in the process are cyclooctene, 1,5-cyclooctadiene and cyclotetradecene. Naturally occurring compounds which contain ethylenically unsaturated cycloaliphatic groups are operable in the process. Examples of such compounds are β-terpinene, α-phellandrene and caryophyllene.

*Example XI*

A glass-lined reaction vessel, similar to that described in Example V, was charged with 10 parts of ethylene, 53.6 parts of methylene iodide, 22 parts of zinc-copper couple, 5 parts of iodine and about 50 parts of dry ethyl ether. The sealed reaction vessel was heated with agitation at 60° C. for 48 hours under autogenous pressure. The reaction vessel was cooled and the volatile products were vented carefully into an evacuated steel cylinder which was cooled in liquid nitrogen. There was obtained 30 parts of reaction products which were shown by vapor-phase chromatography to contain 8%, that is, 2.4 parts, of cyclopropane; yield, 29%.

*Example XII*

Using the procedure as described in Example I, a mixture of 39.3 parts of 1-heptene, 53.6 parts of methylene iodide, 20 parts of zinc-copper couple, 5 parts of iodine and about 70 parts of anhydrous ethyl ether was stirred and heated at refluxing temperature for 30 hours. There was obtained from the reaction mixture 10.56 parts of n-amylcyclopropane, B.P. 128–129° C.; $n_D^{25}$ 1.4105; yield 42%.

*Analysis.*—Calc'd for $C_8H_{16}$: C, 85.63; H, 14.37. Found: C, 85.63; H, 14.29.

*Example XIII*

A mixture of 42 parts of 1-octene, 50 parts of methylene iodide and 13.5 parts of zinc-copper couple (Example A) was reacted as described in Example 1. There was obtained 16.5 parts of pure n-hexylcyclopropane; B.P. 149° C. at 760 mm.; $n_D^{25.5}$ 1.4173; yield, 70%. The infrared spectrum and analytical data were in accord with the assigned structure.

*Analysis.*—Calc'd for $C_9H_{18}$: C, 85.63; H, 14.37. Found: C, 86.16; H, 14.61.

*Example XIV*

Diisobutylene, a commercial mixture of 2,4,4-trimethyl-1-pentene and 2,4,4-trimethyl-2-pentene, was used in this preparation. A mixture of 16.8 parts of diisobutylene, 67.0 parts of methylene iodide, 14.5 parts of zinc-copper couple, 5 parts of iodine and about 70 parts of ethyl ether was stirred and heated at refluxing temperature for 25 hours. Using the procedure as described in Example II, there was obtained from the reaction mixture 10.25 parts of (*a*) 1-(tert.-butyl)-2,2-dimethylcyclopropane, boiling at 120–121° C.; $n_D^{25}$ 1.4160, and (*b*) 5.4 parts of 1-methyl-1-neopentylcyclopropane, B.P. 124–125° C.; $n_D^{25}$ 1.4210.

*Analysis.*—Calc'd for $C_9H_{18}$: C, 86.53; H, 14.37. Found (*a*): C, 85.92; H, 14.41. (*b*): C, 85.33; H, 14.23.

*Example XV*

Using the procedure as described in Example II, a mixture of 10.3 parts of biallyl, 80.4 parts of methylene iodide, 25.4 parts of zinc-copper couple, 5 parts of iodine and about 70 parts of anhydrous ethyl ether was stirred and heated at refluxing temperature for 60 hours. There was obtained from the reaction mixture (*a*) 2.11 parts of (3-butenyl)cyclopropane, B.P. 96–97° C.; $n_D^{25}$ 1.4181, and (*b*) 4.90 parts of 1,2-dicyclopropylethane, B.P. 128–129° C.; $n_D^{25}$ 1.4289. These represent yields of 18% and 36%, respectively.

*Analysis.*—Calc'd for $C_7H_{12}$: C, 87.42; H, 12.58. Found: C, 87.07; H, 13.01. Calc'd for $C_8H_{14}$: C, 87.19; H, 12.81. Found: C, 87.79; H, 12.80.

*Example XVI*

(A) A mixture of 10.1 parts of pure cis-3-hexene, 31.6 parts of methylene iodide, 8.9 parts of zinc-copper couple and about 45 parts of anhydrous diethyl ether was refluxed under nitrogen atmosphere with agitation for 20 hours. The solution was cooled, decanted into a separatory funnel and washed successively with dilute hydrochloric acid, dilute sodium bicarbonate solution and water. It was further purified as described in the preceding examples to obtain by fractional distillation 6.0 parts of the original cis-3-hexene and 4.0 parts of cis-1,2-diethylcyclopropane, B.P. 93.5° C.; $n_D^{25}$ 1.4035. The product was shown by infrared spectroscopy and vapor phase chromatography to be the pure cis-form, uncontaminated with the trans-isomer.

*Analysis.*—Calc'd for $C_7H_{14}$: C, 85.63; H, 14.37. Found: C, 85.89; H, 14.32.

(B) The procedure of Part A was repeated using 10 parts of trans-3-hexene in place of the cis-3-hexene. There was recovered from the reaction mixture 6.0 parts of unreacted trans-3-hexene and 1.9 parts of pure trans-1,2-diethylcyclopropane boiling at 86.5° C.; $n_D^{25}$ 1.3982. This product was shown by infrared spectroscopy and vapor phase chromatography to be the pure trans-isomer.

*Analysis.*—Calc'd for $C_7H_{14}$: C, 85.63; H, 14.37. Found: C, 85.54; H, 14.49.

*Example XVII*

A mixture of 29.6 parts of methyl oleate, 53.6 parts of methylene iodide, 22 parts of zinc-copper couple, 5 parts of iodine and about 75 parts of anhydrous diethyl ether was heated with stirring at reflux temperature for 48 hours. The reaction mixture was treated by the procedure described in the preceding examples. There was obtained a crude liquid product which was heated under reduced pressure until material boiling up to about 151° C./0.4 mm. was obtained. At this point, the distillation was topped and the liquid residue (17 parts) remaining in the distillation pot was mixed with 4 parts of potassium hydroxide and about 80 parts of ethanol. The mixture was heated at reflux temperature for 4 hours, filtered, the filtrate diluted with 400 parts of water and sufficient concentrated hydrochloric acid was added to make the solution acid. A solid product precipitated which was separated by filtration and dried in air to yield 15 parts of cis-9,10-methyleneoctadecanoic acid. The acid (also known as dihydrosterculic acid), after further purification, melted at 36–38° C.

Examples XI through XVII illustrate the process of the invention as applied to open chain aliphatic compounds, which contain one or more olefinic bonds. Other compounds which can be used are propene, isopropene, butene-2 and the like. Example XVI illustrates a particularly valuable advantage of the process, that is, the remarkable stereospecificity of the process wherein cis-ethylenic compounds give exclusively the corresponding cis-cyclopropanes and trans-ethylenic compounds give exclusively the corresponding trans-cyclopropanes. Example XVII is illustrative of the application of the process of the invention to compounds of the type that occur in nature. For example, the D- or the L-form of cis-11,12-methyleneoctadecanoic acid (lactobacillic acid) is obtained from the methyl ester of cis-11,12-octadecenoic acid by the process described in Example XVII. Lactobacillic acid is a naturally occurring acid which promotes the growth of *Lactobacillus delbrueckii.*

Other compounds obtainable by the process of the invention are heptylcyclopropane from ethylene and 1,1-diiodooctane and 1,2-diethyl-3-butylcyclopropane from 3-hexene and 1,1-diiodopentane.

*Example XVIII*

A mixture of 13.6 parts of D-limonene $([\alpha]_D^{23}, +106°)$ 53.6 parts of methylene iodide, 18.2 parts of zinc-copper couple, 0.2 part of iodine and about 105 parts of anhydrous ethyl ether was heated to reflux temperature with agitation for 48 hours. The reaction mixture was processed as described in previous examples to yield 7.6 parts of 4-(1-methylcyclopropyl)-1-methylcyclohexene, B.P. 73° C. at 8.5 mm.; $n_D^{25}$ 1.4679; $[\alpha]_D^{23}, +51°$ C. The compound has the following structure

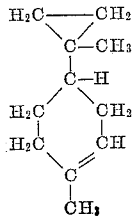

*Analysis.*—Calc'd for $C_{11}H_{18}$: C, 87.90; H, 12.10. Found: C, 87.87; H, 12.26.

Example XVIII illustrates the application of the process of the invention to ethylenically unsaturated compounds in which one of the doubly bonded carbons is bonded to a cycloaliphatic group. The example illustrates again a valuable advantage of the process, that is, the preparation of optically active compounds in pure form.

*Example XIX*

(A) A mixture of 29.4 parts of styrene, 50 parts of methylene iodide, 13.5 parts of zinc-copper couple (Example A), and 53 parts of dry ethyl ether was reacted as described in Example I except that at the end of the reaction the mixture was treated with iced ammonium chloride solution and then extracted with ether. There was obtained 7.0 parts of phenylcyclopropane; B.P. 69° C./22 mm.; $n_D^{24.5}$ 1.5311. The infrared spectrum confirmed the structure of the product. Yield, 32%.

*Analysis.*—Calc'd for $C_9H_{10}$: C, 91.47; H, 8.53. Found: C, 91.42; H, 8.55.

(B) Using the procedure described in Example II, a mixture of 31.2 parts of styrene, 40.2 parts of methylene iodide, 16 parts of zinc-copper couple, 5 parts of iodine and about 70 parts of dry ether was reacted at reflux temperature for 40 hours. There was obtained 3.8 parts of phenylcyclopropane; yield, 21%.

*Example XX*

A mixture of 20 parts of anethole, 80.4 parts of methylene iodide, 25.4 parts of zinc-copper couple, 5 parts of iodine and about 70 parts of dry ethyl ether was reacted as described in Example II for a period of 72 hours. There was obtained 13.79 parts of 1-methyl-2-(p-methoxyphenyl)cyclopropane, B.P. 95–97° C./4 mm.; $n_D^{25}$ 1.5260; yield, 63%.

*Analysis.*—Calc'd. for $C_{11}H_{15}O$: C, 81.57; H, 8.87. Found: C, 81.44; H, 8.70.

*Example XXI*

Using the procedure described in Example II, a mixture of 35.4 parts of allyl benzene, 53.6 parts of methylene iodide, 22.0 parts of zinc-copper couple, 5 parts of iodine and 70 parts of dry ethyl ether was reacted for 48 hours. There was obtained 12.8 parts of benzylcyclopropane, B.P. 122–124° C./102 mm.; $n_D^{25}$ 1.5131; yield, 49%.

*Analysis.*—Calc'd for $C_{10}H_{12}$: C, 90.85; H, 9.15. Found: C, 91.26; H, 9.30.

*Example XXII*

A mixture of 17.1 parts of unsym.-diphenylethylene, 80.4 parts of methylene iodide, 26.0 parts of zinc-copper couple, 5 parts of iodine and 70 parts of dry ethyl ether was reacted for 72 hours as described in Example II. There was obtained 4.44 parts of 1,1-diphenylcyclopropane, B.P. 110–111° C./1.3 mm.; $n_D^{25}$ 1.5847; yield, 24%.

*Analysis.*—Calc'd for $C_{15}H_{14}$: C, 92.74; H, 7.26. Found: C, 92.89; H, 7.59.

*Example XXIII*

A mixture of 23.6 parts of propenylbenzene $(C_6H_5CH{=}CHCH_3)$ 80.4 parts of methylene iodide, 25.4 parts of zinc-copper couple, 5.0 parts of iodine and about 90 parts of anhydrous ethyl ether was heated at refluxing temperature with agitation for 48 hours. The reaction mixture was treated as described in the previous examples. There was obtained 14.25 parts of 1-methyl-1-phenylcyclopropane, B.P. 76–79° C./20 mm.; $n_D^{25}$ 1.5265.

*Analysis.*—Calc'd for $C_{10}H_{12}$: C, 90.85; H, 9.15. Found: C, 91.08; H, 9.16.

*Example XXIV*

(A) A mixture of 27.0 parts of o-propenylanisole $(CH_3OC_6H_4CH{=}CHCH_3)$ 80.4 parts of methylene iodide, 25.4 parts of zinc-copper couple, 5 parts of iodine and about 85 parts of anhydrous ethyl ether was heated at reflux temperature with agitation for 48 hours. The reaction mixture was treated as described in previous examples. There was obtained 20.58 parts of 1-methyl-2-(o-methoxyphenyl)cyclopropane, B.P. 98–99° C./9 mm.; $n_D^{25}$ 1.5298.

*Analysis.*—Calc'd for $C_{11}H_{14}O$: C, 81.44; H, 8.70. Found: C, 81.59; H, 8.61.

(B) A mixture of 29.6 parts of o-allylanisole $(CH_3OC_6H_4CH_2CH{=}CH_2)$ 80.4 parts of methylene iodide, 25.4 parts of zinc-copper couple, 5 parts of iodine and about 85 parts of anhydrous diethyl ether was heated at reflux temperature with agitation for 48 hours. There was obtained from the reaction mixture 13.07 parts of o-methoxybenzylcyclopropane, B.P. 102–103° C./10 mm.; $n_D^{25}$ 1.5245.

*Analysis.*—Calc'd for $C_{11}H_{14}O$: C, 81.44; H, 8.70. Found: C, 81.46; H, 8.81.

*Example XXV*

A mixture of 10.3 parts of trans-ethyl p-methoxycinnamate, 80.4 parts of methylene iodide, 5 parts of iodine and about 75 parts of anhydrous diethyl ether was heated to refluxing with agitation for 48 hours. The reaction mixture was treated as described in the previous examples. There was obtained a solid residue which after crystallization from ethanol gave 3.14 parts of ethyl 2-(p-methoxyphenyl)cyclopropane carboxylate, M.P. 83–84° C.

*Analysis.*—Calc'd for $C_{13}H_{16}O_3$: C, 70.89; H, 7.32. Found: C, 71.03; H, 7.38.

A mixture of 2 parts of the above product, 2 parts of potassium hydroxide and about 12 parts of 85% ethanol was heated to refluxing temperature for 8 hours. The mixture was diluted with 75 parts of water, filtered and acidified with concentrated hydrochloric acid. A solid precipitated which was separated by filtration, dried and crystallized from aqueous ethanol to yield 1.62 parts of trans - 2 - (p-methoxyphenyl)cyclopropanecarboxylic acid, M.P. 114–114.5° C.

Examples XIX through XXV illustrate the application of the process to compounds which contain an ethylenic unsaturation and an aromatic substituent. Example XXV, in particular, again demonstrates a valuable advantage of the process of the invention, that is, the preparation of stereoisomers in pure form and in reasonably good yield.

*Example XXVI*

A mixture of 32.2 parts of vinyl acetate, 50 parts of methylene iodide, 13.5 parts of zinc-copper couple (Example A) and 57 parts of dry ethyl ether was reacted as described in Example XIX. There was obtained 5.8 parts of cyclopropyl acetate, B.P. 112° C./760 mm.; $n_D^{26}$ 1.4095; yield, 31%. The structure of the compound was confirmed by inspection of its infrared spectrum.

*Analysis.*—Calc'd for $C_5H_8O_2$: C, 59.98; H, 8.06. Found: C, 58.70; H, 8.03.

*Example XXVII*

A mixture of 30 parts of methyl crotonate, 53.6 parts of methylene iodide, 22.0 parts of zinc-copper couple, 5 parts of iodine and about 70 parts of dry ethyl ether was reacted for 48 hours as described in Example II. The reaction mixture was treated as described in previous examples. The liquid residue was distilled through an efficient fractionating column to give 2.05 parts of 1-methyl-2-carbomethoxycyclopropane, B.P. 69–70° C./95 mm. The compound when redistilled at atmospheric pressure boiled at 132° C.; $n_D^{25}$ 1.4189.

*Analysis.*—Calc'd for $C_6H_{10}O_2$: C, 63.13; H, 8.83. Found: C, 63.34; H, 8.94.

Examples XXVI and XXVII illustrate the application of the process of the invention to an ester which contains an ethylenic linkage. Other reactants which can be used are vinyl propionate to yield cyclopropyl propionate, vinyl stearate to yield cyclopropyl stearate, vinyl naphthenate to yield cyclopropyl naphthenate, and vinyl benzoate to yield cyclopropyl benzoate. There can also be employed such naturally occurrring products as triterpenes, and esters of triterpene acids.

*Example XXVIII*

A mixture of 19.5 parts of diethyl acetal of acrolein, 53.6 parts of methylene iodide, 19.0 parts of zinc-copper couple, 5 parts of iodine and 70 parts of dry ethyl ether was reacted for 72 hours as described in Example II. In working up the reaction mixture, 10% ammonium hydroxide was used instead of 5% hydrochloric acid, as described in Example II. There was obtained 2.42 parts of the diethyl acetal of cyclopropanecarboxaldehyde, $C_3H_5{-}CH(OC_2H_5)_2$, B.P. 97–100° C./93 mm.; $n_D^{25}$ 1.4134; yield, 12%.

*Example XXIX*

A mixture of 10.0 parts of dihydropyran, 53.6 parts of methylene iodide, 18.2 parts of zinc-copper couple 0.1 part of iodine and about 90 parts of anhydrous ethyl ether was heated with agitation at refluxing temperature for 16 hours. The reaction mixture was processed as described in previous examples to yield 7.6 parts of 2-oxabicyclo[4.1.0]heptane, B.P. 121° C.; $n_D^{26}$ 1.4492. The compound has the structure

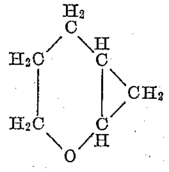

*Analysis.*—Calc'd for $C_6H_{10}O$: C, 73.43; H, 10.27. Found: C, 73.65; H, 10.32.

Examples XXVIII and XXIX illustrate the application of the process to an ethylenic compound in which one of the doubly bonded carbons is bonded to an ether oxygen. Other reactants which can be used are vinyl octyl ether to form cyclopropyl octyl ether and the diethyl acetal of crotonaldehyde to form the diethyl acetal of 2-methyl cyclopropylcarboxaldehyde.

The process of the invention is operable with ethylenically unsaturated amides. For example, N,N-dimethyl carbamoylcyclopropane is obtained from dimethyl acrylamide and methylene iodide and the dimethyl amide of 9,10-methyleneoctadecanoic acid is obtained from dimethyl oleamide and methylene iodide, using a procedure as described in Example XVII.

*Example XXX*

A mixture of 57 parts of anhydrous diethyl ether, 50 parts of methylene iodide, 20.4 parts of zinc-copper couple and a small crystal of iodine was stirred for 15 minutes in a glass reaction vessel equipped with a reflux condenser and a tube filled with a drying reagent. Tetramethylethylene (15.7 parts) was added to the mixture which was then heated to refluxing temperature with agitation for 15 hours. There was obtained from the reaction mixture 12.1 parts of liquid, boiling at 72–74° C. This product which was a mixture of unreacted tetramethylethylene and 1,1,2,2-tetramethylcyclopropane was subjected to vapor phase chromatography and there was obtained 7.4 parts of pure 1,1,2,2-tetramethylcyclopropane, boiling at 73° C.; $n_D^{25}$, 1.3980. The identity of the product was confirmed by its infrared spectrum and mass spectrum cracking pattern.

Example XXX illustrates the application of the process of the invention to prepare an ethylenically unsaturated compound in which the carbons joined by the double bond are completely substituted, that is none of the doubly-bonded carbons is bonded to hydrogen. Examples of other ethylenically unsaturated compounds which are completely substituted and which are operable in the process are 2,3-dimethyl-2-hexene to yield 1,1,2-trimethyl-2-propylcyclopropane, 4,5-dipropyl-4-octene to yield 1,1,2,2-tetrapropylcyclopropane, 1,2-dimethyl-1-cyclohexene to yield 1,6-trimethyl-bicyclo[4,1,0]heptane, and 1,2,3,4-tetramethyl-bicyclo[2,2,1]-2-heptene (also called 1,4-dimethylsantene) to yield 1,2,4,5-tetramethyl-tricyclo[3,2,$1^{1.5}0^{2.4}$]-octane.

The process of the invention is not limited to compounds of the examples. The process can be applied to a wide range of naturally occurring and synthetic products.

I claim:

1. The method of preparing a compound containing a cyclopropyl group which comprises reacting, under substantially anhydrous conditions, in a solvent for components (1) and (2), and at reaction temperature, (1) a compound of up to 40 carbons having the formula:

wherein each R represents a member of the group consisting of hydrogen and aliphatic, cycloaliphatic and carbocyclic aromatic groups free of acetylenic unsaturation and which are singly bonded to the ethylenic carbons through a linkage of the group consisting of carbon and oxygen with the proviso that at most one of said linkages is oxygen and at most one of the ethylenic carbons bears aromatic groups, and R groups may be joined to form an aliphatic ring, (2) a compound of the formula:

RCHXI wherein R is a member of the group consisting of hydrogen and an organic group free of Zerewitinoff active hydrogen and X is a halogen of atomic number of 17–53 inclusive, and (3) a composition consisting essentially of zinc and copper in a ratio of 99:1 to 80:20.

2. The process of claim 1 wherein the reaction temperature is from about −20° C. to about 300° C.

3. The process of claim 1 wherein said solvent contains at least one oxygen which is singly bonded to each of two carbons, component (2) is an aliphatically saturated 1-halo-1-iodohydrocarbon of 1–8 carbons wherein the halo atom is of atomic number 17–53, and the reaction temperature is from about −20° C. to about 300° C.

4. The process of claim 3 wherein component (2) is reacted with component (3) in said solvent and in the presence of a catalytic quantity of iodine, and the resultant product is then reacted with component (1).

5. The process of claim 3 wherein component (1) is a cycloaliphatic hydrocarbon.

6. The process of claim 3 wherein component (1) is an olefin.

7. The process of claim 3 wherein component (1) is an oxygen-interrupted hydrocarbon.

8. The process of claim 3 wherein component (1) is a hydrocarbyloxycarbonyl-substituted hydrocarbon.

9. The process of claim 3 wherein component (2) is a 1,1-diiodoalkane of 1–8 carbons.

10. The process of claim 1 wherein the solvent for components (1) and (2) is selected from the group consisting of ROR′ and RC(O)OR′, wherein R and R′ are saturated hydrocarbons of up to 8 carbons, and together have a total of up to 12 carbon atoms, and the reaction temperature is from about −20° C. to about 300° C.

11. The method of claim 10 wherein component (2) is methylene iodide.

12. The method of claim 10 wherein component (2) is chloromethyl iodide.

13. The process of preparing cis-9,10-methyleneoctadecanoic acid which comprises contacting methyl oleate, methylene iodide and a composition consisting essentially of zinc and copper in the ratio of 99:1 to 80:20 at a temperature of from about −20° C. to about 300° C. under substantially anhydrous conditions in a solvent of the group consisting of ROR′ and RC(O)OR′, wherein R and R′ are saturated hydrocarbons of up to 8 carbons, and together have a total of up to 12 carbons.

14. The process of preparing 4-(1-methylcyclopropyl)-1-methylcyclohexene which comprises contacting D-limonene, methylene iodide and a composition consisting essentially of zinc and copper in the ratio of 99:1 to 80:20 at a temperature of from about −20° C. to about 300° C. under substantially anhydrous conditions in a solvent of the group consisting of ROR′ and RC(O)OR′, wherein R and R′ are saturated hydrocarbons of up to 8 carbons, and together have a total of up to 12 carbons.

15. The process of preparing ethyl 2-(p-methoxyphenyl)cyclopropane carboxylate which comprises contacting transethyl p-methoxycinnamate, methylene iodide and a composition consisting essentially of zinc and copper in the ratio of 99:1 to 80:20 at a temperature of from about −20° C. to about 300° C. under substantially anhydrous conditions in a solvent of the group consisting of ROR′ and RC(O)OR′, wherein R and R′ are saturated hydrocarbons of up to 8 carbons, and together have a total of up to 12 carbons.

References Cited in the file of this patent

Emschwiller: Chem. Abst., 23, 4668 (1929).

Bergmann: The Chemistry of Acetylene and Related Compounds, page 80 (1948).

Harmon et al.: J. Am. Chem. Soc., 72, 2213–16 (1950).